United States Patent
Liu (10) Patent No.: US 9,504,278 B2
(45) Date of Patent: Nov. 29, 2016

(54) ELECTRONIC CIGARETTE CASE, METHOD AND SYSTEM FOR MANAGING INFORMATION OF ELECTRONIC CIGARETTE CASE

(71) Applicant: Qiuming Liu, Shenzhen (CN)

(72) Inventor: Qiuming Liu, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 110 days.

(21) Appl. No.: 14/460,094

(22) Filed: Aug. 14, 2014

(65) Prior Publication Data

US 2015/0196053 A1 Jul. 16, 2015

(30) Foreign Application Priority Data

Jan. 10, 2014 (WO) ................ PCT/CN2014/070483

(51) Int. Cl.

| | |
|---|---|
| H04Q 5/22 | (2006.01) |
| A24F 15/18 | (2006.01) |
| A24F 47/00 | (2006.01) |
| G06F 3/041 | (2006.01) |
| G06K 7/00 | (2006.01) |
| G06K 7/10 | (2006.01) |
| H02J 7/00 | (2006.01) |

(52) U.S. Cl.
CPC ............. *A24F 15/18* (2013.01); *A24F 47/008* (2013.01); *G06F 3/041* (2013.01); *G06K 7/0008* (2013.01); *G06K 7/10297* (2013.01); *H02J 7/0042* (2013.01); *H02J 7/0052* (2013.01)

(58) Field of Classification Search
CPC combination set(s) only.
See application file for complete search history.

(56) References Cited

U.S. PATENT DOCUMENTS

| | | | |
|---|---|---|---|
| 2011/0265806 A1 | 11/2011 | Alarcon et al. | |
| 2012/0214107 A1 | 8/2012 | Al Gharib | |
| 2013/0319439 A1* | 12/2013 | Gorelick | ............... A24F 47/008 131/329 |
| 2013/0340775 A1 | 12/2013 | Juster et al. | |
| 2014/0107815 A1* | 4/2014 | LaMothe | ................ A24F 15/18 700/90 |

FOREIGN PATENT DOCUMENTS

CN  102970885 A  3/2013

* cited by examiner

*Primary Examiner* — Brian Zimmerman
*Assistant Examiner* — Thomas McCormack (57) ABSTRACT

An electronic cigarette case comprises an information receiving and sending module, a microprocessor and a sliding touch control module. The microprocessor is configured to collect at least one kind of data selected from the group consisting of personal information data, electronic cigarette case data, and electronic cigarette data. The sliding touch control module is configured to sense a sliding touch signal of a user and transmit the sliding touch signal to the microprocessor. The microprocessor controls the information receiving and sending module to send the data collected by the microprocessor to the electronic device according to the sliding touch signal.

14 Claims, 4 Drawing Sheets

ELECTRONIC CIGARETTE CASE, METHOD AND SYSTEM FOR MANAGING INFORMATION OF ELECTRONIC CIGARETTE CASE

CROSS REFERENCE TO RELATED APPLICATIONS

This application claims priority to International Application No. PCT/CN2014/070483, filed Jan. 10, 2014, which is hereby incorporated herein in its entirety by reference.

FIELD OF THE INVENTION

The present disclosure relates to a field of electronic cigarette, and more particularly, relates to an electronic cigarette case, a method and system for managing information of an electronic cigarette case.

BACKGROUND OF THE INVENTION

Electronic cigarette is one kind of electronic device that is currently popular on the market. Since the electronic cigarette can help smokers to give up smoking, it is bought by many persons who want to give up smoking. Electronic cigarette case is configured to accommodate electronic cigarettes. When the electric energy of an electronic cigarette battery is exhausted, a built-in battery of the electronic cigarette case can be used to charge the electronic cigarette conveniently.

However, at present, electronic cigarette case can be only used to accommodate electronic cigarettes, charge electronic cigarettes, and so on. In this case, the function of the electronic cigarette case is too single to meet more needs of users.

SUMMARY OF THE INVENTION

The objective of the present disclosure is to provide an electronic cigarette case, an method and system for managing information of an electronic cigarette case, aiming at the defect that the function of electronic cigarette case in the prior art is too single.

The technical solutions of the present disclosure for achieving the objective are as follows:

In one aspect, an electronic cigarette case is provided in the present disclosure. The electronic cigarette case comprises an information receiving and sending module, a microprocessor and a sliding touch control module;

the information receiving and sending module and the sliding touch control module connected to the microprocessor respectively; and the information receiving and sending module communicating with an external electronic device;

the microprocessor configured to collect at least one kind of data selected from the group consisting of personal information data, electronic cigarette case data, and electronic cigarette data;

the sliding touch control module configured to sense a sliding touch signal of a user and transmit the sliding touch signal to the microprocessor; and the microprocessor configured to control the information receiving and sending module to send the data collected by the microprocessor to the electronic device according to the sliding touch signal.

In one embodiment, the electronic cigarette case further comprises a prompting module connected to the microprocessor and configured to send out prompting information.

In another embodiment, the microprocessor is further configured to control the information receiving and sending module to receive electronic cigarette data sent by an electronic cigarette to collect the electronic cigarette data.

In another embodiment, wherein the microprocessor is further configured to control the information receiving and sending module to receive personal information data sent by the electronic device to collect the personal information data.

In another embodiment, the electronic cigarette case further comprises a RFID card for storing the personal information data;

when the sliding touch control module senses the sliding touch signal, the microcontroller controlling the information receiving and sending module to send the personal information data stored in the RFID card to the electronic device.

In another embodiment, the electronic cigarette case further comprises a charge management module of a built-in battery and a charge management module of a battery pole that are connected to the microprocessor respectively;

the microprocessor collecting the electronic cigarette case data through the charge management module of the built-in battery and the charge management module of the battery pole.

In another embodiment, the information receiving and sending module includes a USB interface circuit, an I2C interface circuit, a RS232 interface circuit, a SPI interface circuit, an infrared interface circuit or a RF interface circuit.

In another embodiment, the electronic cigarette case comprises a case body;

wherein an opening for receiving the information receiving and sending module is defined in the case body, and an opening for receiving the prompting module is defined in the case body; and wherein the microprocessor is received in the case body.

In another embodiment, the information receiving and sending module is a WiFi module, a Zigbee module, a Bluetooth module, a RF module or a NFC module.

In another aspect, a method for managing information of an electronic cigarette case is provided in the present disclosure. The method for managing information of an electronic cigarette case comprises the following steps:

collecting at least one kind of data selected from the group consisting of personal information data, electronic cigarette case data and electronic cigarette data by a microprocessor of the electronic cigarette case;

sensing a sliding touch signal of a user and transmitting the sliding touch signal to the microprocessor by a sliding touch control module of the electronic cigarette case;

controlling an information receiving and sending module of the electronic cigarette case to send the data collected by the microprocessor to an external electronic device according to the sliding touch signal by the microprocessor.

In one embodiment, the method further comprises:

counting and analyzing the received data by the electronic device, sending a analysis result to an associated device by the electronic device; or generating prompting information based on the analysis result by the electronic device.

In one embodiment, the process for counting and analyzing comprises:

comparing the received data with a preset threshold relating to the received data, and obtaining an user behavior data according to the received data;

wherein the user behavior data includes at least one kind of data selected from the group consisting of a number of times of smoking during a preset time, a duration time of each smoking, a number of times of deep smoking, a number of times of shallow smoking, a smoking time interval, a number of times of charge and discharge of a built-in battery of the electronic cigarette case and a number of times of charge and discharge of a power supply battery of an electronic cigarette.

In another embodiment, the method further comprises:
sending out the prompting information by the electronic device;
receiving the prompting information by the information receiving and sending module of the electronic cigarette case;
displaying the prompting information and/or sending out a prompt according to the prompting information by a prompting module of the electronic cigarette case.

In another embodiment, the method further comprises:
collecting the electronic cigarette data by a microcontroller of an electronic cigarette;
sending the electronic cigarette data to the electronic cigarette case by a data transmission module of the electronic cigarette;
wherein the electronic cigarette data includes at least one kind of data selected from the group consisting of a time when each smoking signal is collected, a duration time of each collected smoking signal, an voltage value of the smoking signal and a remaining capacity of a power supply battery of the electronic cigarette.

In another embodiment, the method further comprises:
storing the personal information data in a RFID card;
when the sliding touch control module senses the sliding touch signal, controlling the information receiving and sending module to send the personal information data stored in the RFID card to the electronic device by the microcontroller.

In another embodiment, the electronic cigarette case data includes at least one kind of data selected from the group consisting of a number of times of charge of the electronic cigarette case, a number of times of discharge of the electronic cigarette case, a charging and discharging capacity of the electronic cigarette case, a number of times of charge of an electronic cigarette, a charging time interval of an electronic cigarette and a remaining capacity of a built-in battery of the electronic cigarette case.

In another aspect, a system for managing information of an electronic cigarette case is provided in the present disclosure. The system for managing information of an electronic cigarette case comprises an electronic cigarette case and an external electronic device communicating with the electronic cigarette case;
the electronic cigarette case comprising a microprocessor, an information receiving and sending module and a sliding touch control module;
the microprocessor collecting at least one kind of data selected from the group consisting of personal information data, electronic cigarette case data and electronic cigarette data;
the sliding touch control module configured to sense a sliding touch signal of a user and transmit the sliding touch signal to the microprocessor;
the microprocessor configured to control the information receiving and sending module of the electronic cigarette case to send the data collected by the microprocessor to the external electronic device according to the sliding touch signal.

In one embodiment, the electronic device counts and analyzes the received data, and sends a analysis result to an associated device; or
generates prompting information based on the analysis result.

In one embodiment, the electronic cigarette case further comprises a prompting module configured to display prompting information received by the information receiving and sending module; and/or
configured to send out a prompt according to the prompting information.

In another embodiment, the system further comprises an electronic cigarette communicating with the electronic cigarette case;
the electronic cigarette comprising a microcontroller and a data transmission module connected to the microcontroller;
the microcontroller configured to collect the electronic cigarette data,
the data transmission module configured to transmit the electronic cigarette data to the electronic cigarette case;
wherein the electronic cigarette data includes at least one kind of data selected from the group consisting of a time when each smoking signal is collected, a duration time of each collected smoking signal, an voltage value of the smoking signal and a remaining capacity of a power supply battery of the electronic cigarette.

When implement the electronic cigarette case, the method and system for managing information of the electronic cigarette case of the present disclosure, the following advantageous effects can be achieved: all kinds of data related to smoking can be recorded and transmitted to an electronic device, and the data can be analyzed by an electronic device to obtain a user's smoking habit. In this case, it is helpful for users to give up smoking by using such electronic cigarette case, method and system for managing information of the electronic cigarette case. Moreover, service, battery maintenance suggestions, and so on, can be supplied to users to prolong the service life of the battery and save users' cost. Additionally, by using such electronic cigarette case, the method and system for managing information of the electronic cigarette case of the present disclosure, it is convenient and efficient for users to unload and share their personal information, and also convenient for users to collect information and socialize, and also can improve the user experience.

BRIEF DESCRIPTION OF THE DRAWINGS

The present disclosure will be further described with reference to the accompanying drawings and embodiments in the following, in the accompanying drawings.

DETAILED DESCRIPTION OF THE PREFERRED EMBODIMENT

To make the technical feature, objective and effect of the present disclosure be understood more clearly, now the specific implementation of the present disclosure is described in detail with reference to the accompanying drawings and embodiments.

Figure 1:
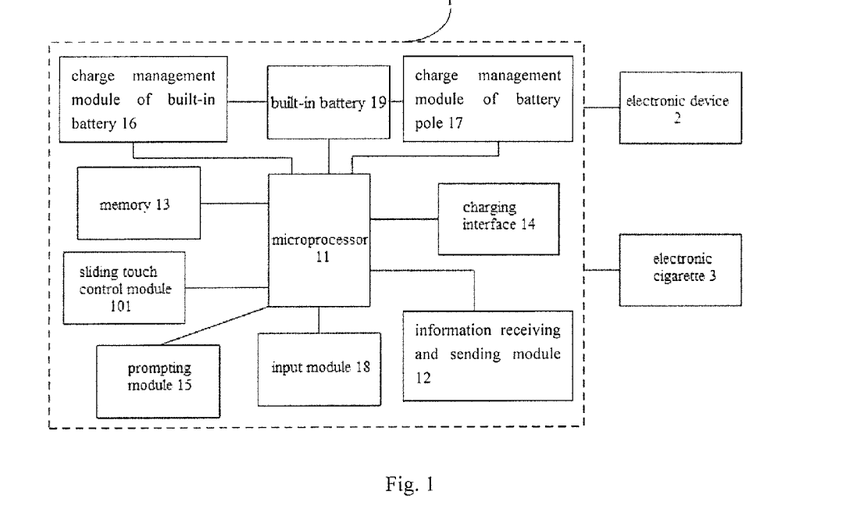
FIG. 1 is a block diagram of an electronic cigarette case according to one embodiment of the present disclosure.

As shown in FIG. 1, a block diagram of an electronic cigarette case according to one embodiment of the present disclosure. The electronic cigarette case in the present disclosure comprises a microprocessor 11 and an information receiving and sending module 12. Advantageously, the electronic cigarette case in the present disclosure further comprises a memory 13, a charge interface 14, a prompting module 15, a charge management module of a built-in battery 16, a charge management module of a battery pole 17, an input module 18, a built-in battery 19 and a sliding touch control module 101. The information receiving and sending module 12, the memory 13, the charge interface 14, the prompting module 15, the charge management module of the built-in battery 16, the charge management module of the battery pole 17, the input module 18, the built-in battery 19 and the sliding touch control module 101 are connected to the microprocessor 11, respectively. The built-in battery 19 also is connected to the charge management module of the built-in battery 16 and the charge management module of the battery pole 17, respectively. The information receiving and sending module 12 communicates with an external electronic device.

The microprocessor 11 is configured to collecting at least one kind of data selected from the group consisting of personal information data, electronic cigarette case data and electronic cigarette data. Wherein the personal information data includes at least one kind of data selected from the group consisting of name, age and contact information. The electronic cigarette data includes at least one kind of data selected from the group consisting of a time when each smoking signal is collected, a duration time of each collected smoking signal, a voltage value of the smoking signal and a remaining capacity of a power supply battery of the electronic cigarette. The electronic cigarette case data includes at least one kind of data selected from the group consisting of a number of times of charge of the electronic cigarette case, a number of times of discharge of the electronic cigarette case, a charging and discharging capacity of the electronic cigarette case, a number of times of charge of an electronic cigarette, a charging time interval of an electronic cigarette and a remaining capacity of the built-in battery of the electronic cigarette case.

The personal information data can be sent to the electronic cigarette case by an electronic device 2, and be stored by the electronic cigarette case. Additionally, the personal information data also can be set by the input module 18, or be written in and stored in a RFID card.

The electronic cigarette case data are collected by the microprocessor 11 though the built-in battery charge management module 16 and the battery pole charge management module 17.

The electronic cigarette data are collected by data interaction carried out by the electronic cigarette 3.

The memory 13 can be a flash memory chip or an EEPROM memory chip. The memory 13 is configured to store the personal information data, the electronic cigarette case data, the electronic cigarette data, the model and specification of a battery pole matching the electronic cigarette case, and so on. The specification of the battery pole can be, for example, 650 mah, 900 mah or 1100 mah, etc. (mah is the measurement unit of the battery capacity.)

The sliding touch control module 101 is configured to sense a sliding touch signal of a user and transmit the sliding touch signal to the microprocessor 11. The microprocessor 11 is configured to control the information receiving and sending module 12 to send the data collected by the microprocessor 11 to the electronic device 2 according to the sliding touch signal. The data are analyzed by the electronic device 2 to obtain a user behavior data. If the information receiving and sending module 12 sends out data in a wired method, the information receiving and sending module 12 may be a USB interface circuit, an I2C interface circuit, a RS232 interface circuit or a SPI interface circuit, so that the external electronic device can be connected to the information receiving and sending module 12 of the electronic cigarette case via a data line, or the like, to obtain the data. If the information receiving and sending module 12 sends out data in a wireless method, the information receiving and sending module 12 includes a receiving and sending circuit. The receiving and sending circuit includes an antenna, a filter circuit, an impedance matching circuit, or the like. The information receiving and sending module 12 may be a WiFi module, a Zigbee module, a Bluetooth module, a NFC module, an infrared interface circuit, a RF module or a RF interface circuit using a frequency, such as 315 MHz, 433 MHz or 900 MHz, and so on, for data transmission.

Additionally, the microprocessor 11 also can control the information receiving and sending module 12 to receive information sent by the electronic device 2 according to the sliding touch signal. For example, the information receiving and sending module 12 can receive the prompting information sent by the electronic device 2, and the microprocessor 11 controls the prompting module 15 to sent out a prompt according to the prompting information.

The microprocessor 11 may be MCU or CPU. For example, the chip, of which the model is MSP430F5529, can serve as the microprocessor 11.

In one embodiment of the present disclosure, the microprocessor 11 also can control the prompting module 15 to display the received data, such as the remaining capacity of the built-in battery of the electronic cigarette case, the remaining capacity of the power supply battery of the electronic cigarette.

The electronic cigarette case in the present disclosure can receive or send out the personal information data via the following communication process: collect and store the personal information data sent by the electronic device 2, including name, age, contact information, and so on. The information receiving and sending module 12 of the electronic cigarette case sends the personal information data to another device, such as another electronic cigarette case, mobile terminal, or the like. Advantageously, the RFID technology can be used to transfer personal information data between the devices very near each other. Specifically, a RFID card can be mounted in the electronic cigarette case, and the personal information data is stored in the RFID card. When the sliding touch control module 101 has sensed the sliding touch signal, a microprocessor 11 controls the information receiving and sending module 12 to send the personal information data stored in the RFID card to the electronic device 2, so that the electronic device 2 can obtain the personal information data stored in the electronic cigarette case. The RFID card mounted in the electronic cigarette case may be active ones or passive ones. Additionally, the electronic cigarette case can send the personal information data stored in the memory to the electronic device 2 in other methods, such as WiFi, Bluetooth, or the like. Thus, the electronic cigarette case of the present disclosure is convenient and efficient for users to unload and share the personal information, and also convenient for users to collect information and socialize. In such case, the user experience can be improved.

In the embodiment of the present disclosure, the sliding touch control module 101 may be a sliding touch control chip, of which the model may be BF6910A, BF6911A, BF6921A, or the like. The sliding touch signal is signals resulting from touch events, such as the continuous movement of a fingertip across the sliding touch control module 101, such as touch screen.

Figure 2:
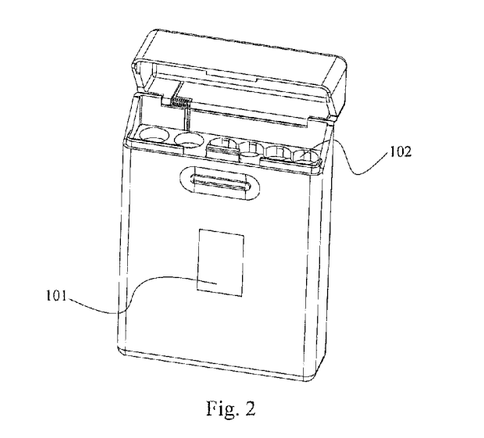
FIG. 2 is a structural schematic view of an electronic cigarette case according to one embodiment of the present disclosure.

As shown in FIG. 2, a structural schematic view of an electronic cigarette case according to one embodiment of the present disclosure. In FIG. 2, the sliding touch control module 101 and an accommodating slot for accommodating electronic cigarettes 102 are visible. An opening for taking electronic cigarettes out or putting them in is defined in the electronic cigarette case. Data can be received or sent by operating the sliding touch control module 101. In the embodiment of the present disclosure, the sliding touch control module 101 can be designed to sense a sliding touch signal, which is generated by sliding in a direction toward the opening of the electronic cigarette case. When the fingertip of the user slides on the sliding touch control module 101 in a direction towards the opening, a simulation of data sending process can be generated. For example, when the fingertip of a user slides on sliding touch control module 101 in a direction towards the opening, the personal data information is sent to another electronic device, which shows a vivid data sending process to improve user experience.

The electronic cigarette case according to the embodiment of the present disclosure further includes a case body. An opening configured to receive a USB interface circuit, an I2C interface circuit, a RS232 interface circuit, a SPI interface circuit, an infrared interface circuit or a RF interface circuit is defined in the case body. An opening configured to receive the prompting module 15 is defined in the case body. The microprocessor 11 is received in the case body.

The processes for collecting the electronic cigarette case data will be described in detail, combined with FIG. 3 and FIG. 4 as follows.

Figure 3:
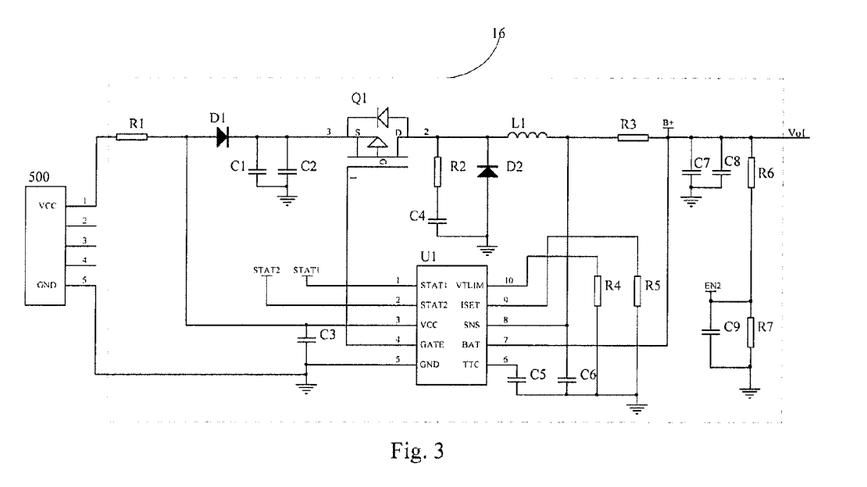
FIG. 3 is a circuit diagram of a charge management module of a built-in battery according to one embodiment of the present disclosure.

As shown in FIG. 3, a circuit diagram of the charge management module of a built-in battery 16 according to one embodiment of the present disclosure. The charge management module of the built-in battery 16 includes a charge management chip U1. The model of the charge management chip U1 is HB6293A.

As shown in FIG. 3, in the charge management module of the built-in battery 16 of the present disclosure, the first pin of the charge management chip U1 is connected to an I/O pin (such as the P6.4/CB4/A4 pin of the chip of which the model is MSP430F5529) of the microprocessor 11. The second pin of the charge management chip U1 is connected to an I/O pin (such as the P6.7/CB7/A7 of the chip of which the model is MSP430F5529) of the microprocessor 11. The third pin of the charge management chip U1 is grounded via a capacitor C3 and further connected to the anode (the VCC terminal as shown in FIG. 3) of an external power source 500 via a resistor R1. The fourth pin of the charge management chip U1 is connected to the grid of a MOSFET Q1. The fifth pin of the charge management chip U1 is grounded. The sixth pin of the charge management chip U1 is grounded via a capacitor C5. The seventh pin of the charge management chip U1 is connected to the anode (the B+ terminal as shown in FIG. 3) of the built-in battery 19. The eighth pin of the charge management chip U1 is grounded via a capacitor C6 and further connected to one end of an inductor L1. The ninth pin of the charge management chip U1 is grounded via a resistor R5. The tenth pin of the charge management chip U1 is grounded via a resistor R4. Additionally, the VCC terminal of the external power source 500 is connected to the anode of a diode D1 via a resistor R1. The cathode of the diode D1 is grounded via a capacitor C1 and a capacitor C2 respectively and further connected to the source of the MOSFET Q1. The drain of the MOSFET Q1 is connected to one end of the inductor L1 and the cathode of a diode D2 respectively; and the drain of the MOSFET Q1 is grounded via a resistor R2 and a capacitor C4 connected with each other in series. Another end of the inductor L1 is also connected to the anode of the built-in battery 19 via a resistor R3.

The diode D1 is configured to avoid a reversal connection of the external power resource 500 occurring. The charge management chip U1 can control the MOSFET Q1 to be on or off by controlling the output voltage of the fourth pin, so that the over voltage protection and the charge management can be achieved. The first pin of the charge management chip U1 is configured to send a signal indicating that the charge for the built-in battery 700 has finished to the microprocessor 11, and the second pin of the charge management chip U1 is configured to send a signal indicating that the built-in battery 700 is being charged to the microprocessor 11. Thus, the charge management can be achieved. Thus, the microprocessor 11 can get the number of times of charge of the electronic cigarette case by recording the number of times of sending signal by the charge management chip U1.

As shown in FIG. 3, in the charge management module of the built-in battery 16 of the present disclosure, one end of a resistor R6 is connected to the anode of the built-in battery 19, and another end of the resistor R6 is connected to a first AD pin (such as the P6.5/CB6/A6 pin of the chip, of which the model is MSP430F5529) of the microprocessor 11, and further connected to one end of the resistor R7. One end of the resistor R7 is also connected to the first AD pin of the microprocessor 11, and another end of the resistor R7 is connected to the fifteenth pin of the microprocessor 11. One end of a capacitor C9 is connected to the first AD pin of the microprocessor 11, and another end of the capacitor C9 is connected to the second end of the resistor R7 and further is grounded. The one end of a capacitor C7 is connected to the anode of the built-in battery 19, and another end of the capacitor C7 is grounded. One end of a capacitor C8 is connected to the anode of the built-in battery 19, and another end of the capacitor C8 is grounded. Thus, the charge management module of the built-in battery 16 in the present disclosure can detect the remaining capacity of the built-in battery 19, and also detect whether a low voltage occurred in the built-in battery 19.

Specifically, a charging voltage of the built-in battery 19 is sampled by divider resistors R6 and R7. The remaining capacity of the built-in battery 19 of the electronic cigarette case can be obtained according to the charging voltage. The corresponding relation between the remaining capacity and the charging voltage value is pre-stored in the memory 13. The microprocessor 11 can detect the charging voltage value of the built-in battery 19 of the electronic cigarette case, after that, the microprocessor 11 can obtain the remaining capacity corresponded to the detected charging voltage value.

Figure 4:
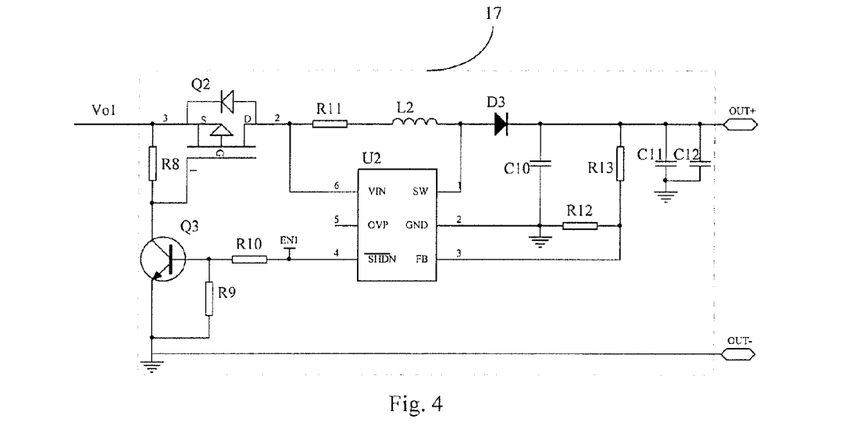
FIG. 4 is a circuit diagram of a charge management module of a battery pole according to one embodiment of the present disclosure.

As shown in FIG. 4, a circuit diagram of a charge management module of a battery pole according to one embodiment of the present disclosure. As shown in FIG. 4, the OUT+ terminal and the OUT− terminal are both ends of the charging interface 14. The charge management module of the battery pole 17 in the present disclosure comprises a boosting chip U2, a triode Q2, a triode Q3 and a diode D3. Wherein the model of the boosting chip U2 is CP2121. The first pin of the boosting chip U2 is SW pin, the second pin of the boosting chip U2 is GND pin, the third pin of the boosting chip U2 is FB pin, the fourth pin of the boosting chip U2 is $\overline{\text{SHDN}}$ pin, the fifth pin of the boosting chip U2 is OVP pin, the sixth pin is VIN pin. Wherein the $\overline{\text{SHDN}}$ pin is connected to an I/O pin (such as the P6.6/CB6/A6 pin of the chip, of which the model is MSP430F5529) of the microprocessor 11, and further connected to the base of the triode Q3 via a resistor R10. The base of the triode Q3 is also grounded via a resistor R9. The emitter of the triode Q3 is grounded. The collector of the triode Q3 is connected to the grid of the MOSFET Q2 and further connected to the source of the MOSFET Q2 and the anode (B+ terminal) of the built-in battery 19 via a resistor R8. The drain of the MOSFET Q2 is connected to the VIN pin of the boosting chip U2, and further connected to one end of an inductor L2 via a resistor R11. Another end of the inductor L2 is connected to the SW pin of the boosting chip U2 and the anode of the diode D3 respectively. The cathode of the diode D3 is connected to one end of the capacitor C10 and the OUT+ terminal respectively. One end of a resistor R13 is connected to the cathode of the diode D3 and the OUT+ terminal respectively. Another end of the resistor R13 is connected to the FB pin of the boosting chip U2 and one end of a resistor R12. Another end of the resistor R12 is grounded. Another end of the capacitor C10 is grounded. The GND pin of the boosting chip is grounded. One end of a capacitor C11 is grounded, and another end of the capacitor C11 is connected to the cathode of the diode D3 and the OUT+ terminal respectively. One end of a capacitor C12 is grounded, and another end of the capacitor C12 is connected to the cathode of the diode D3 and the OUT+ terminal respectively. The OUT− terminal is grounded.

When the I/O pin of the microprocessor 11 connected to the $\overline{\text{SHDN}}$ pin outputs a high level signal, the triode Q3 is on, the MOSFET Q2 is on and the $\overline{\text{SHDN}}$ pin of the boosting chip U2 is at a high level, the boosting chip U2 start to work. In such case, after the charging voltage of the built-in battery 19 boosted, the electronic cigarette inserted into the charging interface 14 is charged. When the I/O pin of the microprocessor 11 connected to the $\overline{\text{SHDN}}$ pin outputs a low level signal, the triode Q3 is off, the MOSFET Q2 is off and the $\overline{\text{SHDN}}$ pin of the boosting chip U2 is at a low level, the boosting chip U2 stop working, (be off) and stop charging the electronic cigarette.

The microprocessor 11 can control the triode Q3 and the MOSFET Q2 of a boosting circuit 302 to be on or off by controlling the I/O pin connected to the $\overline{\text{SHDN}}$ pin to output a high level signal or a low level signal, so that the electronic cigarette can be charged or stopped.

In the embodiment of the present disclosure, the microprocessor 11 controls the I/O pin connected to the $\overline{\text{SHDN}}$ pin to output a high level signal or a low level signal in one method selected from the following two methods:

(1) When the electronic cigarette is inserted into the charging interface 14, i.e., when a power supply battery of the electronic cigarette is connected to the charging interface 14, a charging circuit is on, and the microprocessor 11 controls the I/O pin connected to the $\overline{\text{SHDN}}$ pin to output a high level signal to start a charging process. Otherwise, output a low level signal.

(2) A detection module that is connected to the microprocessor 11 and the charging interface 14 respectively is provided in the electronic cigarette case, configured to detect whether the electronic cigarette is inserted into the charging interface or not. For example, the detection module may be a Hall sensor. In such case, when the electronic cigarette is inserted into the charging interface 14, the Hall sensor sends a signal to the microprocessor 11, and the microprocessor 11 controls the I/O pin connected to the $\overline{\text{SHDN}}$ pin to output a high level signal to start a charging process. It should be understood that the detection module may be other elements (such as a pressure sensor), as long as one can have detection function.

The microprocessor 11 can count, while that the charging process starts (i.e., when the I/O pin connected to the $\overline{\text{SHDN}}$ pin is controlled to output a high level signal) is detected, thus, the number of times of charge of the electronic cigarette can be obtained. Additionally, the microprocessor 11 can get the charging time interval of the electronic cigarette by recording the detecting time when each charging process starts and calculating the difference between every two detecting time.

In the second method, the detection module can get the number of times of pulling out the electronic cigarette from the electronic cigarette case by detecting whether the electronic cigarette is inserted into the charging interface or not.

In addition, the charging and discharging capacity of the electronic cigarette case can be calculated according to the range of a charging current (a constant current for charging the power supply battery of the electronic cigarette) and the charging time.

Thus, the electronic cigarette case in the present disclosure can obtain the electronic cigarette case data through the charge management module of the built-in battery 16 and the charge management module of the battery pole 17. After got the aforementioned data, the microprocessor 11 can control the prompting module 15 to process these data, such as displaying these data, so that a user can know the data clearly, such as the remaining capacity of the built-in battery, the number of times of charge, and so on.

The processes for collecting electronic cigarette data will be described in detail, combined with FIG. 5 and FIG. 6 as follows.

Figure 5:
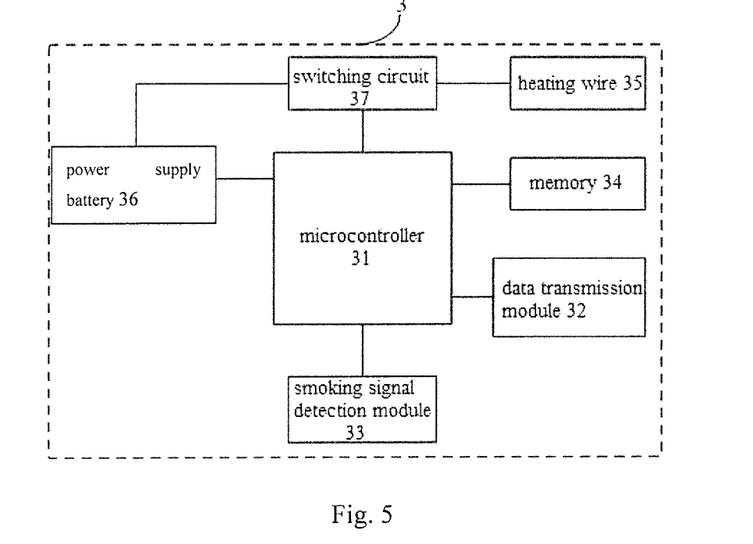
FIG. 5 is a block diagram of an electronic cigarette according to one embodiment of the present disclosure.
Figure 6:
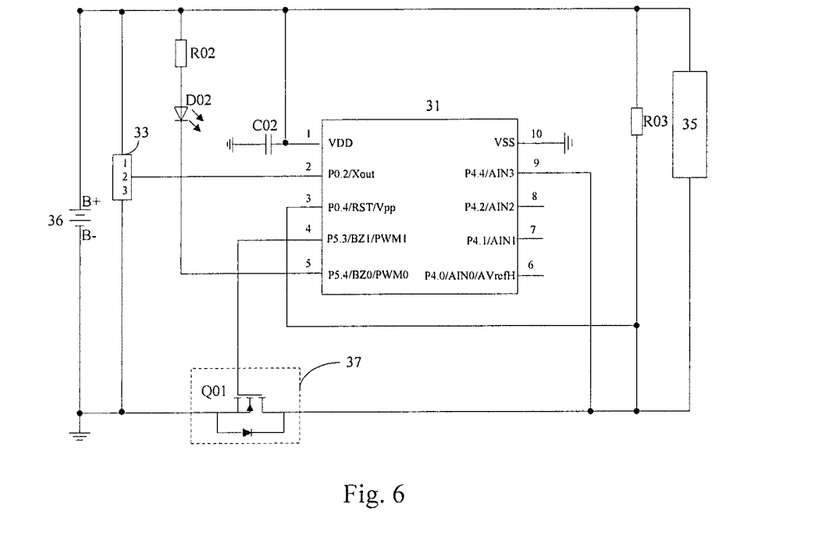
FIG. 6 is a circuit diagram of an electronic cigarette according to one embodiment of the present disclosure.

As shown in FIG. 5, a block diagram of an electronic cigarette according to one embodiment of the present disclosure. The electronic cigarette 3 of the present disclosure comprises a microcontroller 31, a data transmission module 32, a smoking signal detection module 33, a memory 34, a heating wire 35, a power supply battery 36 and a switching circuit 37. The power supply battery 36, the smoking signal detection module 33, the memory 34, the data transmission module 32, the switching circuit 37 are connected to the microcontroller 31 respectively. The switching circuit 37 is connected to the power supply battery 36 and the heating wire 35 respectively. The microcontroller 31 controls the switching circuit 37 to be on or off. When the switching circuit 37 is on, the power supply battery 36 supplies power to the heating wire 35. When the switching circuit 37 is off, the power supply battery 36 stops supplying power to the heating wire 35.

The smoking signal detection module 33 is configured to detect a smoking signal and send the smoking signal to the microcontroller 31. The smoking signal detection module 33 may be a sensor or an input module. The input module can be a button or a touch screen. The sensor may be an air pressure sensor, an air flow sensor, or the like.

The microcontroller 31 is configured to record the time when each smoking signal is collected and the duration time of each collected smoking signal, after received the smoking signal detected by the smoking signal detection module.

The duration time of each collected smoking signal is equal to the duration time of each smoking. The time interval between every two smoking signals is the smoking interval. The number of times of collecting smoking signals by the microcontroller 31 is equal to the number of times of smoking. In addition, the number of times of smoking can be calculated according to the remaining capacity of the built-in battery of the electronic cigarette and the power consumption of each smoking. The power consumption of each smoking is dependent on the specification of the electronic cigarette.

If the smoking signal detection module 33 is an air pressure sensor, the number of times of the deep smoking and the number of times of the shallow smoking can be obtained according to the range of the voltage signal (the voltage value of the smoking signal) of the air pressure sensor. Specifically, preset a voltage value, compare the voltage value of the smoking signal with the preset voltage value; and if the voltage value of the smoking signal is higher than the preset voltage value, conclude that it is deep smoking. Otherwise, conclude that it is shallow smoking. In such case, the number of times of deep smoking and the shallow smoking can be obtained. It should be understood that the number of times of deep smoking and shallow smoking can be calculated and sent to the electronic cigarette case by the microcontroller 31 of the electronic cigarette, and then be sent to the external electronic device by the electronic cigarette case. The number of times of deep smoking and shallow smoking also can be calculated automatically by the electronic device according to the voltage value of the smoking signal.

The memory 34 is configured to store the aforementioned the electronic cigarette data. The memory 34 may be a Flash memory chip or an EEPROM memory chip.

The data transmission module 32 is configured to transmit the smoking data stored in the memory 34 and the remaining capacity of the power supply battery to the external device, such as the electronic cigarette case. Specifically, the data transmission module 32 can communicate with the information receiving and sending module 12 of the electronic cigarette case 1 to transmit the electronic cigarette data to the electronic cigarette case 1. The electronic cigarette case 1 receives and stores the electronic cigarette data, and then controls the information receiving and sending module 12 to send the electronic cigarette data to the electronic device 2 as needed.

The process for collecting and transmitting the electronic cigarette data is described as follows combined with FIG. 6. As shown in FIG. 6, a circuit diagram of an electronic cigarette according to one embodiment of the present disclosure. The model of the microcontroller 31 is SN8P2711. The smoking signal detection module 33 is an air pressure sensor. The switching circuit 37 includes a MOSFET Q01. The first pin (the VDD pin) of the microcontroller 31 is grounded via a filter capacitor C02. The first pin (i.e., the input terminal of the power source) of the microcontroller 31 is also connected to the anode of the power supply battery 36. The second pin (i.e., the P0.2/Xout pin) of the microcontroller 31 is connected to the output terminal of the air pressure sensor 33. The third pin (i.e., the P0.4/RST/Vpp pin) of the microcontroller 31 is connected to one end of a resistor R03 and the drain of the MOSFET Q01 respectively. Another end of the resistor R03 is connected to the anode of the power supply battery 36. The fourth pin (i.e., the P5.3/BZ1/PWM1 pin) of the microcontroller 31 is connected to the grid of the MOSFET Q01. The ninth pin (i.e., the P4.4/AIN4 pin) of the microcontroller 31 is connected to the drain of the MOSFET Q01. The tenth pin (i.e., the VSS pin) of the microcontroller 31 is grounded. The source of the MOSFET Q01 is connected to the cathode of the power supply battery 36. The power source terminal of the air pressure sensor 33 is connected to the anode of the power supply battery 36; and the grounded terminal of the air pressure sensor 33 is grounded. One end of the heating wire 35 is connected to the anode of the power supply battery 36, and another end of the heating wire 35 is connected to the drain of the MOSFET Q01.

The power supply voltage of the power supply battery 36 can be obtained by detecting the voltage of the first pin of the microcontroller 31. The corresponding relation between the remaining capacity and the power supply voltage value is pre-stored in the memory 34 (not shown). After detected the power supply voltage value, the microprocessor 31 can obtain the remaining capacity corresponded to the power supply voltage value.

Since the second pin of the microcontroller 31 is connected to the output terminal of the air pressure sensor 33, the time when a voltage signal is received by the second pin of the microcontroller 31 is the time when a smoking signal is collected. The duration time of the voltage signal is the duration time of each collected smoking signal. The deep smoking or the shallow smoking can be judged according to the range of the voltage signal. In such case, the duration time of each smoking, the number of times of smoking, the number of times of deep smoking, the number of times of the shallow smoking and the smoking interval can be obtained.

In the embodiment of the present disclosure, the data transmission module 32 is connected to the microcontroller 31 for transmitting the electronic cigarette data to the external device. The data transmission module 32 may be a WiFi module, a Zigbee module, a Bluetooth module, a NFC module, an infrared interface circuit, a RF interface circuit, or the like. The RF interface circuit can use a frequency for data transmission, such as 315 MHz, 433 MHz or 900 MHz. The data transmission module 32 also may be a USB interface circuit, an I2C interface circuit, a RS232 interface circuit, a SPI interface circuit, or the like.

It should be understood that the microcontroller 31 of the embodiment of the present disclosure also may be a chip, of which the model is MSP430F5529.

In the embodiment of the present disclosure, the electronic cigarette 3 can transmit the electronic cigarette data to the electronic cigarette case 1. The electronic cigarette data is further processed by the electronic cigarette case 1. Advantageously, the USB interface circuit for charging and data transmitting can be arranged in the electronic cigarette case 1. When the electronic cigarette 3 is inserted into the interface, the data transmission can be achieved, so that the electronic cigarette data is transmitted to the electronic cigarette case 1. In such case, the electronic cigarette case 1 can collect the electronic cigarette data.

The electronic cigarette case of the present disclosure can collect, record and transmit all kinds of data related to smoking. The external electronic device can analyze the data to obtain user's smoking habit. In such case, it is helpful for users to give up smoking. The process for analyzing the data by the external electronic device is described in detail as follows.

Figure 7:
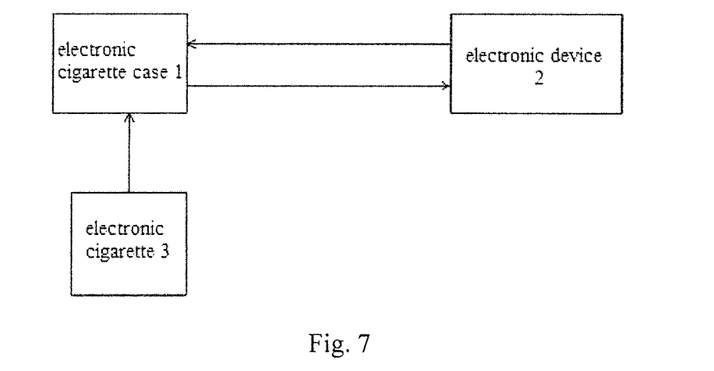
FIG. 7 is a block diagram of a system for managing information of an electronic cigarette case according to one embodiment of the present disclosure.

As shown in FIG. 7, a block diagram of a system for managing information of an electronic cigarette case. The system for managing information of an electronic cigarette case comprises an electronic cigarette case 1 and an external electronic device 2 communicating with the electronic cigarette case 1.

The electronic cigarette case 1 includes a microprocessor 11, an information receiving and sending module 12 and a sliding touch control module 101. The microprocessor 11 collects at least one kind of data selected from the group consisting of personal information data, electronic cigarette case data and electronic cigarette data. The sliding touch control module 101 senses a sliding touch signal of a user and sends the sliding touch signal to the microprocessor 11. The microprocessor 11 controls the information receiving and sending module 12 of the electronic cigarette case 1 to send the data collected by the microprocessor 11 to the external electronic device 2 and/or receive the data sent by the external electronic device 2 according to the sliding touch signal.

The external electronic device 2 counts and analyzes the received data, and sends an analysis result to an associated device (such as an appointed mobile terminal, a computer, or the like) or generates prompting information based on the analysis result and send the prompting information to the associated device.

The system for managing information of the electronic cigarette case in the present disclosure further includes an electronic cigarette 3 communicating with the electronic cigarette case 1. The electronic cigarette 3 collects electronic cigarette data and sends the electronic cigarette data to the electronic cigarette case 1.

The processes for counting and analyzing carried out by the electronic device 2 of the present disclosure includes: compare the received data with a preset threshold of the received data, obtain a user behavior data according to the received data.

Whether all kinds of the data are in the preset range can be determined by comparing the received data with the preset threshold of the received data. For example, the preset number of times of charge of the electronic cigarette case is 100, when the number of times of charge of the electronic cigarette case exceeds 100, the prompting information can be sent to the electronic cigarette case 1. The electronic cigarette case 1 includes a prompting module 15. The information receiving and sending module 12 receives the prompting information, and the prompting module 15 displays the prompting information sent by the electronic device 2 and/or sending out a prompt according to the prompting information, so that the user can know that.

In addition, the prompting information in the present disclosure further includes the remaining capacity of the built-in battery 19, the number of times of charge of the electronic cigarette case, the number of times of discharge of the electronic cigarette case, the number of times of charge of the electronic cigarette, the charging time interval of the electronic cigarette, the charging and discharging capacity of the electronic cigarette case, the charging prompt, and so on. The prompting module 15 can send out a prompt according to the aforementioned prompting information.

The user behavior data includes at least one kind of data selected from the group consisting of the number of times of smoking during a preset time, the duration time of each smoking, the number of times of deep smoking, the number of times of shallow smoking, the smoking interval, the number of times of charge and discharge of the built-in battery of the electronic cigarette case and the number of times of charge and discharge of the power supply battery of the electronic cigarette. The number of times of smoking during the preset time is concluded according to the time when each smoking signal has been collected. Specifically, for example, when the preset time is 1 h (12:00-13:00), the number of times of smoking during this 1 h can be concluded according to the time when each smoking signal is collected. The duration time of each smoking can be gotten in such methods: preset a duration time to indicate a second smoking on condition of a time interval between every two adjacent collected smoking signals exceeding the duration time. Thus, the duration time of each smoking can be gotten according to the time when each smoking signal is collected and the preset duration time. The smoking interval can be gotten according to the time interval between every two adjacent collected smoking signals. The number of times of deep smoking and the shallow smoking can be obtained in such way: preset a voltage value, and compare the voltage value of the smoking signal with the preset voltage value; and if the voltage value of the smoking signal exceeds the preset voltage value, conclude that it is a deep smoking. Otherwise, conclude that it is a shallow smoking.

In the embodiment of the present disclosure, the external electronic cigarette 2 receives a data sent by the electronic cigarette case 1, and processes the data to supply useful information for users to give up smoking. Specifically, the deep smoking and shallow smoking are related to the power supply voltage, and are also related to the tobacco juices inhaled by a user. Thus, calculating the number of times of deep smoking and shallow smoking can be assisted for the user to know his/her smoking habit and adjust that, thus, it can be benefit for his/her health. The number of times of smoking during a preset time, the duration time of each smoking, and the smoking interval are related to user's using frequency. Thus, counting these three kinds of data can be assisted for the user to know his/her smoking condition and adjust the frequency of smoking. The service life of the battery can be gotten by analyzing the service condition of the built-in battery and the power supply battery according to the number of times of charge of the electronic cigarette case and the number of times of discharge of the electronic cigarette case (and the charging and discharging capacity of the electronic cigarette case, the number of times of charge of the electronic cigarette, the charging time interval of the electronic cigarette, the remaining capacity of the built-in battery of the electronic cigarette case and the remaining capacity of the power supply battery of the electronic cigarette, etc.), which supplies a user with service and battery maintenance suggestions to prolong the service life of the battery and save the cost of the user.

Figure 8:
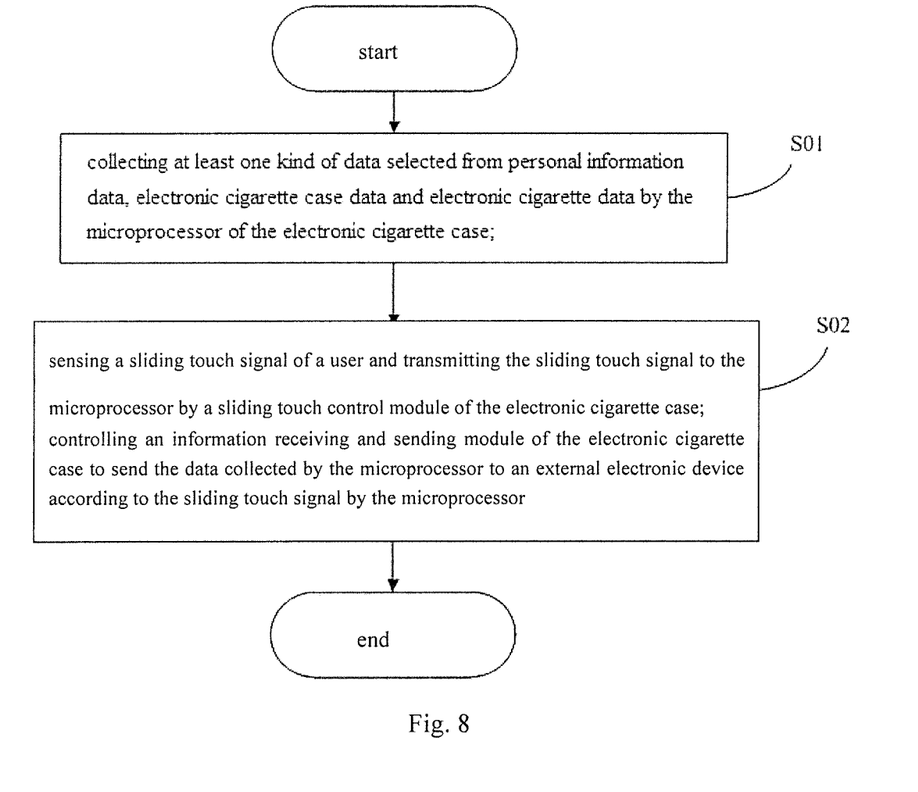
FIG. 8 is a flow chart of a method for managing information of an electronic cigarette case according to one embodiment of the present disclosure.

As shown in FIG. 8, a flow chart of a method for managing information of an electronic cigarette case in the present disclosure. The method for managing information of an electronic cigarette case further comprises the following steps:

S01: the microprocessor of the electronic cigarette case collects at least one kind of data selected from the group consisting of personal information data, electronic cigarette case data and electronic cigarette data.

S02: the sliding touch control module of the electronic cigarette case senses a sliding touch signal of a user and transmits the sliding touch signal to the microprocessor; the microprocessor controls the information receiving and sending module of the electronic cigarette case to send the data collected by the microprocessor to the external electronic device according to the sliding touch signal.

The method for managing information of an electronic cigarette case of the present disclosure further comprises: the electronic device counts and analyzes the received data, and sends an analysis result to the associated device, or, generates the prompting information basing on the analysis result and sends the prompting information to the associated device. Wherein the process for counting and analyzing includes the following steps: compare the received data with a preset threshold of the received data, and obtain the user behavior data according to the received data.

The method for managing information of an electronic cigarette case of the present disclosure further comprises: the information receiving and sending module of the electronic cigarette case receives the prompting information; the prompting module of the electronic cigarette case displays the prompting information and/or sends out a prompt.

The method for managing information of an electronic cigarette case of the present disclosure further comprises: the microcontroller of the electronic cigarette collects the electronic cigarette data, and the data transmission module of the electronic cigarette sends the electronic cigarette data to the electronic cigarette case.

The method for managing information of an electronic cigarette case of the present disclosure further comprises: store the personal information data in a RFID card; when the sliding touch control module senses the sliding touch signal, the microprocessor controls the information receiving and sending module to send the personal information data stored in the RFID card to the electronic device.

The electronic cigarette case, the method and system for managing information of the electronic cigarette case in the present disclosure can achieve data transmission between the electronic cigarette case and the external electronic device, so that the data related to the smoking habit of a user can be sent to the external electronic device. Then the external electronic device counts and analyzes the data, and then sends an analysis result to the electronic cigarette case. Electronic cigarette case displays the analysis result or sends out prompting information, so that the user can know his/her using condition and smoking condition via the electronic cigarette case. On one hand, the service, battery maintenance suggestions, and so on, are supplied for users to prolong the service life of the battery and save the cost of the user. On the other hand, it is convenient and efficient for users to unload and share their personal information by using the electronic cigarette case of the present disclosure, and also is convenient for users to collect information and socialize, and also improves user experience.

It should be understood that the electronic device 2 may be hardware equipment including various operating systems, such as a mobile phone, a tablet computer, a personal digital assistant, a desktop computer, and so on.

While the embodiments of the present disclosure are described with reference to the accompanying drawings above, the present disclosure is not limited to the abovementioned specific implementations. In fact, the abovementioned specific implementations are intended to be exemplary not to be limiting. In the inspiration of the present disclosure, those ordinary skills in the art can also make many modifications without breaking away from the subject of the present disclosure and the protection scope of the claims. All these modifications belong to the protection of the present disclosure.

The invention claimed is:

1. An electronic cigarette case, comprising:
an information receiving and sending module,
a microprocessor,
a sliding touch control module, and
a charge management module of a built-in battery and a charge management module of a battery pole;
wherein the information receiving and sending module, the sliding touch control module, the charge management module of the built-in battery and the charge management module of the battery pole are connected to the microprocessor respectively; and the information receiving and sending module is communicated with an external electronic device;
wherein the microprocessor is configured for collecting at least one kind of data selected from the group consisting of personal information data, electronic cigarette case data and electronic cigarette data, the microprocessor collects the electronic cigarette case data through the charge management module of the built-in battery and the charge management module of the battery pole;
wherein the electronic cigarette case data further includes at least one kind of data selected from the group consisting of a number of times of charge of the electronic cigarette case, a number of times of discharge of the electronic cigarette case, a charging and discharging capacity of the electronic cigarette case, a number of times of charge of an electronic cigarette, a charging time interval of an electronic cigarette and a remaining capacity of the built-in battery of the electronic cigarette case;
wherein the sliding touch control module is configured for sensing a sliding touch signal of a user in a direction towards an opening defined in the electronic cigarette case for taking electronic cigarettes out or putting electronic cigarettes in and transmitting the sliding touch signal to the microprocessor; and
wherein the microprocessor is further configured for controlling the information receiving and sending module to send the data collected by the microprocessor to the electronic device according to the sliding touch signal;
wherein, the charge management module of the built-in battery includes a charge management chip U1, a first pin of the charge management chip U1 is connected to an I/O pin of the microprocessor, a second pin of the charge management chip U1 is connected to an I/O pin of the microprocessor, a third pin of the charge management chip U1 is grounded via a capacitor C3 and further connected to the anode of an external power source via a resistor R1, a fourth pin of the charge management chip U1 is connected to the grid of a MOSFET Q1, a fifth pin of the charge management chip U1 is grounded, a sixth pin of the charge management chip U1 is grounded via a capacitor C5, a seventh pin of the charge management chip U1 is connected to the anode of the built-in battery, a eighth pin of the charge management chip U1 is grounded via a capacitor C6 and further connected to one end of an inductor L1, a ninth pin of the charge management chip U1 is grounded via a resistor R5, a tenth pin of the charge management chip U1 is grounded via a resistor R4; the VCC terminal of the external power source is connected to the anode of a diode D1 via a resistor R1, the cathode of the diode D1 is grounded via a capacitor C1 and a capacitor C2 respectively and further connected to the source of the MOSFET Q1, the drain of the MOSFET Q1 is connected to one end of the inductor L1 and the cathode of a diode D2 respectively, the drain of the MOSFET Q1 is grounded via a resistor R2 and a capacitor C4 connected with each other in series, another end of the inductor L1 is also connected to the anode of the built-in battery via a resistor R3; one end of a resistor R6 is connected to the anode of the built-in battery, and another end of the resistor R6 is connected to a first AD pin of the microprocessor, and further connected to one end of the resistor R7, One end of the resistor R7 is also connected to the first AD pin of the microprocessor, and another end of the resistor R7 is connected to the fifteenth pin of the microprocessor, one end of a capacitor C9 is connected to the first AD pin of the microprocessor, and another end of the capacitor C9 is connected to the second end of the resistor R7 and further is grounded, the one end of a capacitor C7 is connected to the anode of the built-in battery, and another end of the capacitor C7 is grounded, one end of a capacitor C8 is connected to the anode of the built-in battery, and another end of the capacitor C8 is grounded; and the charge management module of the battery pole comprises a boosting chip U2, a triode Q2, a triode Q3 and a diode D3, a fourth pin of the boosting chip U2 is connected to an I/O pin of the microprocessor, and further connected to the base of the triode Q3 via a resistor R10, the base of the triode Q3 is also grounded via a resistor R9, the emitter of the triode Q3 is grounded, the collector of the triode Q3 is connected to the grid of the triode Q2 and further connected to the source of the triode Q2 and the anode of the built-in battery via a resistor R8, the drain of the triode Q2 is connected to a sixth pin of the boosting chip U2, and further connected to one end of an inductor L2 via a resistor R11, another end of the inductor L2 is connected to a first pin of the boosting chip U2 and the anode of the diode D3 respectively, the cathode of the diode D3 is connected to one end of the capacitor C10 and the OUT+ terminal respectively, one end of a resistor R13 is connected to the cathode of the diode D3 and the OUT+ terminal respectively, another end of the resistor R13 is connected to a third pin of the boosting chip U2 and one end of a resistor R12, another end of the resistor R12 is grounded, another end of the capacitor C10 is grounded, a second pin of the boosting chip is grounded, one end of a capacitor C11 is grounded, and another end of the capacitor C11 is connected to the cathode of the diode D3 and the OUT+ terminal respectively, one end of a capacitor C12 is grounded, and another end of the capacitor C12 is connected to the cathode of the diode D3 and the OUT+ terminal respectively, and the OUT- terminal is grounded.

2. The electronic cigarette case according to claim 1, wherein, the electronic cigarette case further comprises a prompting module connected to the microprocessor and configured to send out a prompting information.

3. The electronic cigarette case according to claim 1, wherein, the microprocessor is further configured for controlling the information receiving and sending module to receive electronic cigarette data sent by an electronic cigarette to collect the electronic cigarette data.

4. The electronic cigarette case according to claim 1, wherein, the microprocessor is further configured for controlling the information receiving and sending module to receive personal information data sent by the electronic device to collect the personal information data.

5. The electronic cigarette case according to claim 4, wherein, the electronic cigarette case further comprises a RFID card for storing the personal information data;
   when the sliding touch control module senses the sliding touch signal, the microcontroller controlling the information receiving and sending module to send the personal information data stored in the RFID card to the electronic device.

6. The electronic cigarette case according to claim 1, wherein, the information receiving and sending module includes a USB interface circuit, an I2C interface circuit, a RS232 interface circuit, a SPI interface circuit, an infrared interface circuit or a RF interface circuit.

7. The electronic cigarette case according to claim 6, wherein, the electronic cigarette case comprises a case body;
   wherein an opening for receiving the information receiving and sending module is defined in the case body, and an opening for receiving the prompting module is defined in the case body; and
   wherein the microprocessor is received in the case body.

8. The electronic cigarette case according to claim 1, wherein, the information receiving and sending module is a WiFi module, a Zigbee module, a Bluetooth module, a RF module or a NFC module.

9. A method for managing information of an electronic cigarette case comprising:
   collecting at least one kind of data selected from the group consisting of personal information data, electronic cigarette case data and electronic cigarette data by a microprocessor of the electronic cigarette case, and the microprocessor collecting the electronic cigarette case data through a charge management module of the built-in battery and a charge management module of the battery pole, the electronic cigarette case data including at least one kind of data selected from the group consisting of a number of times of charge of the electronic cigarette case, a number of times of discharge of the electronic cigarette case, a charging and discharging capacity of the electronic cigarette case, a number of times of charge of an electronic cigarette, a charging time interval of an electronic cigarette and a remaining capacity of a built-in battery of the electronic cigarette case;
   sensing a sliding touch signal of a user in a direction towards an opening defined in the electronic cigarette case for taking electronic cigarettes out or putting electronic cigarettes in and transmitting the sliding touch signal to the microprocessor by a sliding touch control module of the electronic cigarette case;
   controlling an information receiving and sending module of the electronic cigarette case to send the data collected by the microprocessor to an external electronic device according to the sliding touch signal by the microprocessor;
   wherein, the charge management module of the built-in battery includes a charge management chip U1, a first pin of the charge management chip U1 is connected to an I/O pin of the microprocessor, a second pin of the charge management chip U1 is connected to an I/O pin of the microprocessor, a third pin of the charge management chip U1 is grounded via a capacitor C3 and further connected to the anode of an external power source via a resistor R1, a fourth pin of the charge management chip U1 is connected to the grid of a MOSFET Q1, a fifth pin of the charge management chip U1 is grounded, a sixth pin of the charge management chip U1 is grounded via a capacitor C5, a seventh pin of the charge management chip U1 is connected to the anode of the built-in battery, a eighth pin of the charge management chip U1 is grounded via a capacitor C6 and further connected to one end of an inductor L1, a ninth pin of the charge management chip U1 is grounded via a resistor R5, a tenth pin of the charge management chip U1 is grounded via a resistor R4; the VCC terminal of the external power source is connected to the anode of a diode D1 via a resistor R1, the cathode of the diode D1 is grounded via a capacitor C1 and a capacitor C2 respectively and further connected to the source of the MOSFET Q1, the drain of the MOSFET Q1 is connected to one end of the inductor L1 and the cathode of a diode D2 respectively, the drain of the MOSFET Q1 is grounded via a resistor R2 and a capacitor C4 connected with each other in series, another end of the inductor L1 is also connected to the anode of the built-in battery via a resistor R3; one end of a resistor R6 is connected to the anode of the built-in battery, and another end of the resistor R6 is connected to a first AD pin of the microprocessor, and further connected to one end of the resistor R7, One end of the resistor R7 is also connected to the first AD pin of the microprocessor, and another end of the resistor R7 is connected to the fifteenth pin of the microprocessor, one end of a capacitor C9 is connected to the first AD pin of the microprocessor, and another end of the capacitor C9 is connected to the second end of the resistor R7 and further is grounded, the one end of a capacitor C7 is connected to the anode of the built-in battery, and another end of the capacitor C7 is grounded, one end of a capacitor C8 is connected to the anode of the built-in battery, and another end of the capacitor C8 is grounded; and the charge management module of the battery pole comprises a boosting chip U2, a triode Q2, a triode Q3 and a diode D3, a fourth pin of the boosting chip U2 is connected to an I/O pin of the microprocessor, and further connected to the base of the triode Q3 via a resistor R10, the base of the triode Q3 is also grounded via a resistor R9, the emitter of the triode Q3 is grounded, the collector of the triode Q3 is connected to the grid of the triode Q2 and further connected to the source of the triode Q2 and the anode of the built-in battery via a resistor R8, the drain of the triode Q2 is connected to a sixth pin of the boosting chip U2, and further connected to one end of an inductor L2 via a resistor R11, another end of the inductor L2 is connected to a first pin of the boosting chip U2 and the anode of the diode D3 respectively, the cathode of the diode D3 is connected to one end of the capacitor C10 and the OUT+ terminal respectively, one end of a resistor R13 is connected to the cathode of the diode D3 and the OUT+ terminal respectively, another end of the resistor R13 is connected to a third pin of the boosting chip U2 and one end of a resistor R12, another end of the resistor R12 is grounded, another end of the capacitor C10 is grounded, a second pin of the boosting chip is grounded, one end of a capacitor C11 is grounded, and another end of the capacitor C11 is connected to the cathode of the diode D3 and the OUT+ terminal respectively, one end of a capacitor C12 is grounded, and another end of the capacitor C12 is connected to the cathode of the diode D3 and the OUT+ terminal respectively, and the OUT− terminal is grounded.

10. The method according to claim 9, wherein, further comprises:
counting and analyzing the received data by the electronic device,
sending a analysis result to an associated device by the electronic device; or
generating a prompting information based on the analysis result by the electronic device.

11. The method according to claim 10, wherein, the process for counting and analyzing comprises:
comparing the received data with a preset threshold relating to the received data, and obtaining an user behavior data according to the received data;
wherein, the user behavior data includes at least one kind of data selected from the group consisting of a number of times of smoking during a preset time, a duration time of each smoking, a number of times of deep smoking, a number of times of shallow smoking, a smoking time interval, a number of times of charge and discharge of a built-in battery of the electronic cigarette case and a number of times of charge and discharge of a power supply battery of an electronic cigarette.

12. The method according to claim 10, wherein, further comprises:
sending out the prompting information by the electronic device;
receiving the prompting information by the information receiving and sending module of the electronic cigarette case;
displaying the prompting information and/or sending out a prompt according to the prompting information by a prompting module of the electronic cigarette case.

13. The method according to claim 9, wherein, further comprises:
collecting the electronic cigarette data by a microcontroller of an electronic cigarette;
sending the electronic cigarette data to the electronic cigarette case by a data transmission module of the electronic cigarette;
wherein the electronic cigarette data includes at least one kind of data selected from the group consisting of a time when each smoking signal is collected, a duration time of each collected smoking signal, an voltage value of the smoking signal and a remaining capacity of a power supply battery of the electronic cigarette.

14. The method according to claim 9, wherein, further comprises:
storing the personal information data in a RFID card;
when the sliding touch control module senses the sliding touch signal, controlling the information receiving and sending module to send the personal information data stored in the RFID card to the electronic device by the microcontroller.

* * * * *